United States Patent [19]
Melling, Jr. et al.

[11] Patent Number: 5,387,925
[45] Date of Patent: Feb. 7, 1995

[54] TEST SIGNAL GENERATOR POSITION CURSORS

[75] Inventors: Laurent A. Melling, Jr., Scappoose; Edward D. Wardzala; Douglas C. Stevens, both of Portland; John C. Reynolds, Aloha, all of Oreg.

[73] Assignee: Tektronix, Inc., Wilsonville, Oreg.

[21] Appl. No.: 673,167

[22] Filed: Mar. 18, 1991

Related U.S. Application Data

[63] Continuation of Ser. No. 340,997, Apr. 20, 1989, abandoned.

[51] Int. Cl.6 ............................................. G09G 1/14
[52] U.S. Cl. .................................. 345/134; 345/157; 345/145
[58] Field of Search ............... 340/734, 709, 721, 720; 324/121 R, 77 R; 358/10, 139; 345/134, 133, 135, 145, 146, 157, 162, 163, 168

[56] References Cited

U.S. PATENT DOCUMENTS

| | | | |
|---|---|---|---|
| 4,354,184 | 10/1982 | Woborschil | 340/709 |
| 4,668,947 | 5/1987 | Clarke, Jr. et al. | 340/709 |
| 4,686,523 | 8/1987 | Bristol | 340/709 |
| 4,740,841 | 4/1988 | Slavin | 358/10 |

Primary Examiner—Ulysses Weldon
Assistant Examiner—Xiao M. Wu
Attorney, Agent, or Firm—Francis I. Gray

[57] ABSTRACT

A test signal generator applies a test pattern to a device under test. The output of the device under test is displayed on a video picture monitor. The test signal generator inserts a cursor into the test pattern, the position of the cursor within the test pattern being variable. From the cursor the test signal generator also generates a trigger signal. The trigger signal may be used to trigger the horizontal sweep of a waveform display device to which the output of the device under device is input. By observing the picture monitor an operator may adjust the cursor to a position just prior to an anomaly in the displayed test pattern so that only that portion of the output waveform of the device under test in the vicinity of the cursor is displayed on the waveform display device.

5 Claims, 2 Drawing Sheets

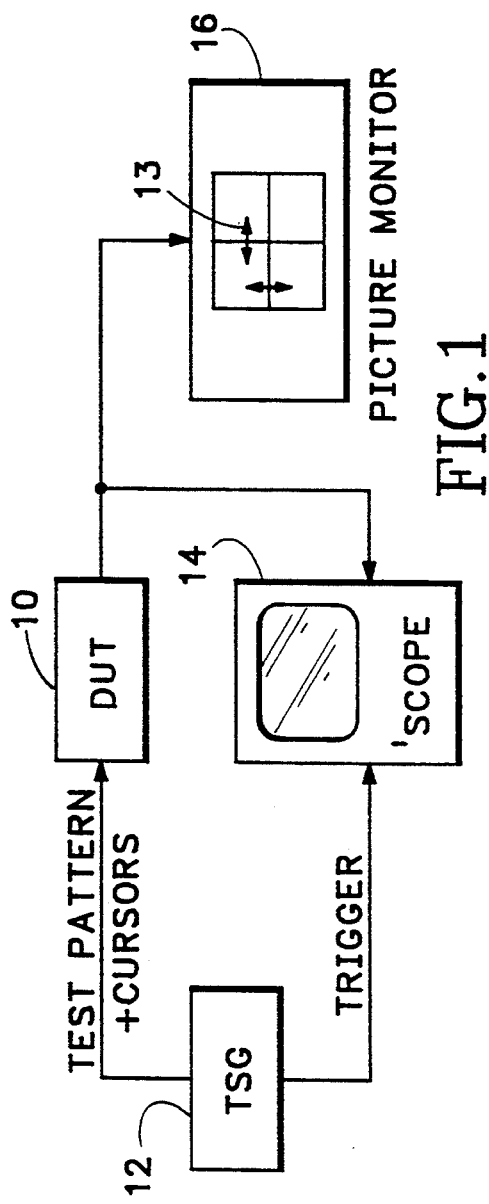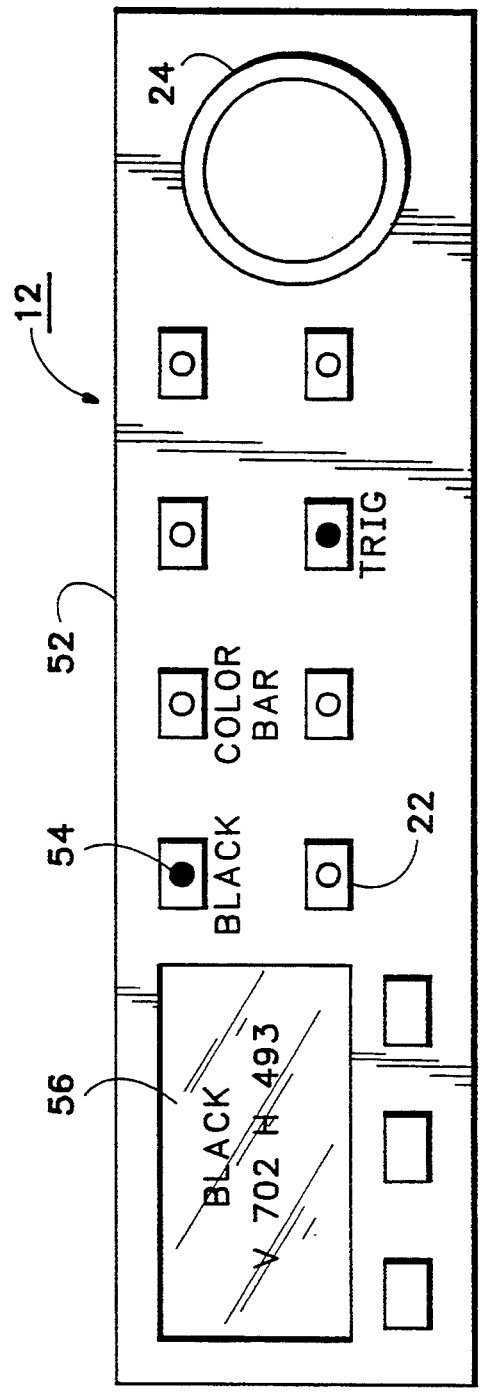

TEST SIGNAL GENERATOR POSITION CURSORS

This is a continuation of application of Ser. No. 07/340,997 filed Apr. 20, 1989 and now abandoned.

BACKGROUND OF THE INVENTION

The present invention relates to device testing, and more particularly to test signal generator position cursors that identify on a monitor a trigger location and that generate a trigger signal so that the video being displayed on the monitor may be closely examined by an oscilloscope or other suitable waveform display device.

In device testing known test patterns are input to a device under test and the output of the device is observed to determine whether there are any anomalies. In a television system the device under test may be a television receiver, a video switcher, a video processor or the like, and the display device may be a video picture monitor and an oscilloscope. Processing artifacts produced by the device under test may show up on the monitor as an anomaly from the expected test pattern.

What is desired is a means for identifying the location of the anomaly and looking at the waveform in the vicinity of the anomaly.

SUMMARY OF THE INVENTION

Accordingly the present invention provides test signal generator position cursors that are inserted into the test pattern. The location of the position cursors may be varied as they appear on a display. The test signal generator also generates a trigger signal at the location of the position cursors that may be used to trigger the horizontal sweep of an oscilloscope. The test pattern with the position cursors is input to a device under test, and the output of the device under test is displayed on a picture monitor and an oscilloscope. The cursors are positioned at a point just prior to an anomaly on the display, and the oscilloscope is triggered to display the waveform of the test pattern from the device under test in the vicinity of the trigger point indicated by the cursors.

The objects, advantages and other novel features of the present invention are apparent from the following detailed description when read in conjunction with the appended claims and attached drawing.

BRIEF DESCRIPTION OF THE DRAWING

FIG. 1 is a block diagram of a test system using test signal generator position cursors according to the present invention.

FIG. 3 is a front plan view of a test signal generator with position cursors according to the present invention.

DESCRIPTION OF THE PREFERRED EMBODIMENT

Figure 2:
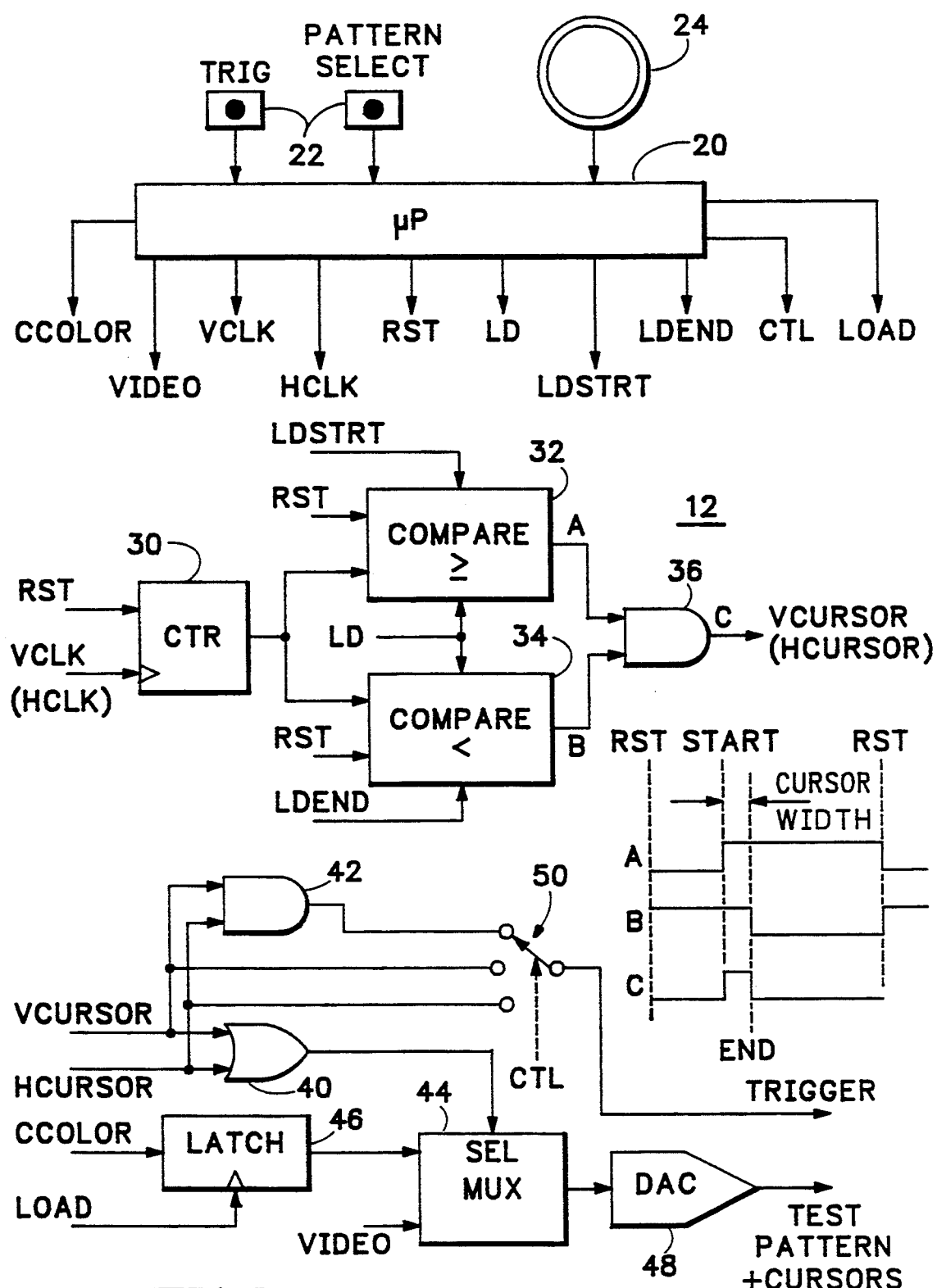
FIG. 2 is a block diagram of a portion of the test signal generator for producing the position cursors.

Referring now to FIG. 1 a system for testing a device 10 with a known test pattern is shown. A test signal generator 12 outputs a test pattern, which includes position cursors 13, that is input to the device 10 under test, and also outputs a trigger signal that is related to the position cursors. The trigger signal is used to trigger an oscilloscope 14. The output of the device 10 under test is input to a picture monitor 16 and to the oscilloscope 14. The position cursors 13 are moved by an operator to a desired location on the display of the picture monitor 16. The trigger signal causes the oscilloscope 14 to trigger its horizontal sweep at a point in the device 10 output waveform corresponding to the location indicated by the position cursors 13. The operator, thus, observes only the waveform from the device 10 under test in the vicinity of the position cursors 13.

As shown in FIG. 2 the test signal generator 12 is controlled by a microprocessor 20 that receives operator inputs from various sources, such as a rotary knob 24, push buttons 22 and the like. The microprocessor 20, in response to the operator inputs, outputs various commands, data and timing signals. A counter 30 receives an appropriate timing signal from timing circuitry within the signal generator 12, such as VCLK for counting vertical lines or HCLK for counting horizontal pixels, and provides a count output to a pair of comparators 32, 34. The microprocessor 20 loads an appropriate value into each comparator 32, 34 to correspond to the location where the particular cursor starts LDSTRT and ends LDEND. When the first comparator 32 detects that the count output is equal to LDSTRT, the output A changes state from a "0" to a "1". When the second comparator 34 detects that the count output is equal to LDEND, the output B changes state from a "1" to a "0". The outputs of the comparators 32, 34 are input to an AND gate 36 that produces a cursor output C corresponding to the particular cursor being generated, either VCURSOR or HCURSOR, and having a width corresponding to the difference between LDSTRT and LDEND.

The generated cursors, VCURSOR and HCURSOR, are input to both an OR gate 40 and an AND gate 42. The output of the OR gate 40 is input to the select terminal of a multiplexer 44. The inputs to the multiplexer 44 are a video pattern from pattern generator circuits in the signal generator 12 according to the test pattern selected by the operator and a cursor color value CCOLOR that is loaded into a latch 46 by the microprocessor. The output of the multiplexer 44 is a digital test pattern or the position cursors that are converted to analog by a digital to analog converter 48 before being input to the device 10 under test. The output from the AND gate 42 and the individual cursor signals, HCURSOR and VCURSOR, are inputs to a switch 50 controlled by the microprocessor 20, the output of the switch being the trigger signal that is input to the oscilloscope 14 so that the oscilloscope is triggered either on HCURSOR, VCURSOR or the concurrence of HCURSOR and VCURSOR. Also a switch, not shown, may be inserted between the output of the OR gate 40 and the multiplexer 44 to disable the cursors so that only the video signal is output from the multiplexer. The cursors also may be disabled by setting appropriate levels for the comparators 32, 34 so that no cursors are generated.

An example of a front panel 52 for the test signal generator 12 is shown in FIG. 3. The front panel 52 includes the push buttons 22 and rotary knob 24. By appropriate selection the operator selects the desired test pattern, such as the BLACK pattern indicated by the light 54 in the black labeled push button 22. An alphanumeric display 56 also indicates the selected test pattern so that an operator can see what is selected from a distance. The test pattern select push buttons 22 may be simple momentary contact buttons. When the trigger push button 22 is pushed, either one or both of the cursors may be activated, i.e., either the horizontal and/or the vertical counter 30 is enabled. The trigger push button may be of a multiple activation type that cycles through a series of modes before returning to the off state. For example, the first push of the trigger push button may activate both cursors and tie the rotary knob 24 to the horizontal cursor, the second push may tie the rotary knob to the vertical cursor, the third push may inactivate one cursor leaving only one activated, the fourth push may reverse the activated cursor, and the fifth push may turn off the cursors. The position of the cursors 13 is displayed alphanumerically on the generator display 56 as a vertical and a horizontal coordinate.

In operation when both cursors are activated the switch 50 selects the output of the AND gate 42 so that the trigger signal is generated at a time corresponding to the pixel that lies at the intersection of the cursors. In this manner each time the signal from the device 10 under test corresponds to that pixel, the oscilloscope sweep is triggered and the waveform from the device subsequent to that pixel is displayed. If only the vertical cursor is activated, then the switch 50 selects VCURSOR so that the trigger signal occurs on every line at the horizontal position corresponding to the cursor location. If only the horizontal cursor is activated, then the switch 50 selects HCURSOR so that the trigger signal occurs for the indicated line of video on the picture monitor 16 similar to a line select function on a television waveform monitor.

Thus the present invention provides position cursors for display on a picture monitor as part of the test pattern from a test signal generator that is applied to a device under test, and generates a trigger signal corresponding to the location of the cursors that can be used to trigger the horizontal sweep of a waveform display device to display the waveform in the vicinity of the location indicated by the cursors.

What is claimed is:

1. An apparatus of the type that generates a selected video test pattern comprising:
   means for counting a clock signal to generate a cursor count;
   means for comparing the cursor count with variable start and end counts to generate a cursor select signal;
   means for switching between the selected video test pattern and a desired color value in response to the cursor select signal to insert a cursor having the desired color value into the selected video test pattern for display with the selected video test pattern on a video monitor; and
   means for generating a trigger signal corresponding to the location of the cursor within the selected video test pattern for input to an analog waveform display device for displaying as an analog waveform a portion of the selected video test pattern determined by the position of the cursor.

2. An apparatus as recited in claim 1 further comprising means for positioning the cursor to a desired location within the selected test pattern.

3. An apparatus as recited in claim 1 further comprising means for controlling the width of the cursor.

4. A method of selecting a portion of an output waveform from a device under test for display comprising the steps of:
   generating a desired video test pattern having a cursor inserted therein for input to the device under test;
   displaying on a video monitor an output of the device under test in response to the desired video test pattern including the cursor;
   positioning the cursor within the displayed output of the device under test at a desired location; and
   generating a trigger signal corresponding to the location of the cursor for triggering a waveform display device to which the output of the device under test is input.

5. A system for selecting a portion of an output waveform from a device under test for display comprising:
   means for generating a desired video test pattern having a cursor inserted therein for input to the device under test;
   means for displaying on a video monitor an output of the device under test in response to the desired video test pattern including the cursor;
   means for positioning the cursor within the displayed output of the device under test at a desired location; and
   means for generating a trigger signal corresponding to the location of the cursor for triggering an analog waveform display device to display the portion of the output waveform indicated by the cursor.

* * * * *